United States Patent [19]
Kaneko

[11] Patent Number: 6,088,703
[45] Date of Patent: Jul. 11, 2000

[54] MATERIAL SUPPLYING SYSTEM AND MATERIAL SUPPLYING METHOD

[75] Inventor: Shunji Kaneko, Kanagawa, Japan

[73] Assignee: Sony Corporation, Tokyo, Japan

[21] Appl. No.: 09/017,285

[22] Filed: Feb. 2, 1998

[30] Foreign Application Priority Data

Feb. 4, 1997 [JP] Japan .................................. 9-021347

[51] Int. Cl.⁷ .................................................. G06F 17/30
[52] U.S. Cl. ........................... 707/104; 707/204; 386/46; 386/83; 348/10; 348/12; 348/13; 348/473; 348/563; 348/569; 348/906
[58] Field of Search ..................... 707/204, 104; 455/5.1, 6.1; 348/7, 12, 13, 563, 10, 569, 906, 473; 386/83, 46

[56] References Cited

U.S. PATENT DOCUMENTS

| | | | |
|---|---|---|---|
| 4,390,904 | 6/1983 | Johnston et al. | 386/53 |
| 4,547,804 | 10/1985 | Greenberg | 348/460 |
| 5,193,171 | 3/1993 | Shinmura et al. | 395/425 |
| 5,274,806 | 12/1993 | Hill | 395/600 |
| 5,276,867 | 1/1994 | Kenley et al. | 395/600 |
| 5,313,631 | 5/1994 | Kao | 707/204 |
| 5,343,251 | 8/1994 | Nafeh | 348/571 |
| 5,463,775 | 10/1995 | DeWitt et al. | 702/186 |
| 5,506,986 | 4/1996 | Healy | 707/204 |
| 5,522,067 | 5/1996 | Swire | 707/204 |
| 5,564,037 | 10/1996 | Lam | 395/488 |
| 5,642,505 | 6/1997 | Fushimi | 395/620 |
| 5,644,766 | 7/1997 | Coy et al. | 395/620 |
| 5,694,162 | 12/1997 | Freeny, Jr. | 348/12 |
| 5,778,390 | 7/1998 | Nelson et al. | 707/204 |
| 5,809,511 | 9/1998 | Peake | 707/204 |
| 5,822,780 | 10/1998 | Schutzman | 711/165 |
| 5,873,103 | 2/1999 | Trede et al. | 707/204 |

Primary Examiner—Hosain T. Alam
Assistant Examiner—Jean M. Corrielus
Attorney, Agent, or Firm—Frommer Lawrence & Haug, LLP; William S. Frommer

[57] ABSTRACT

A material storage unit copies materials to supply buffer units corresponding to a play list. The supply buffer units designate use frequency levels to individually copied materials. The use frequency levels are automatically updated corresponding to the number of times the relevant materials have been supplied. When materials are supplied from the supply buffer units, the relevant supply date/time is stored. When the material storage unit copies material to the supply buffer units, if they do not have blank areas, unnecessary materials are deleted therefrom. At this point, a material whose use frequency level is the lowest and that is not designated in a play list is deleted. When all materials are designated in a play list, a material whose supply date/time is the oldest and whose use frequency level is the lowest is deleted. In addition, a material whose use frequency level is for example "5" is not deleted.

12 Claims, 16 Drawing Sheets

LINK A

| SUPPLY BUFFER UNIT NO. | PRESENCE /ABSENCE OF MATERIAL | FILE NAME | SUPLY COMPLETION FLAG | USE FREQUENCY LEVEL | LAST SUPPLY EXECUTION DATE/TIME (YEAR/MONTH/DAY HR:MIN:SEC) | SUPPLY EXECUTION COUNTER | | | |
|---|---|---|---|---|---|---|---|---|---|
| | | | | | | P1 | P2 | P3 | P4 |
| DABUF1 | PRESENCE | AR012345-1 | OFF | 3 | 96/11/08 08:00:00 | 0 | 8 | 35 | 16 |
| DABUF2 | PRESENCE | AR012345-2 | OFF | 5 | 96/11/14 17:00:00 | 0 | 0 | 5 | 52 |
| DABUF3 | PRESENCE | AR012345-3 | ON | 4 | 96/11/14 15:30:00 | 0 | 2 | 17 | 47 |

Fig. 2

| MATERIAL ID CODE | MATERIAL LENGTH (MIN:SEC: FRAME) | MATERIAL NAME | USE PERIOD (YEAR/ MONTH/DAY) | SPONSOR | SOURCE MATERIAL | SOURCE MATERIAL SOM (HR:MIN: SEC:FRAME) |
|---|---|---|---|---|---|---|
| CAR01234 | 00:30:00 | CUTE 96 NEW CAR | 97/01/31 | ABC COMPANY | T0100123 | 00:00:00:00 |
| AAA31123 | 00:15:00 | BDD BLACK TEA | 96/12/31 | ZZ AGENCY | T0211111 | 00:00:00:00 |
| SSS00234 | 01:00:00 | WWW CANNED COFFEE | 97/03/31 | GDF COMPANY | T0200023 | 00:00:00:00 |
| DAS55612 | 00:15:00 | TTT COSMETICS | 97/01/31 | TTR COMPANY | T0333111 | 00:00:00:00 |
| FTT99231 | 00:15:00 | YY PERSONAL COMPUTER NO.1 | 97/01/15 | YY AGENCY | T0533333 | 00:00:00:00 |
| FTT99232 | 00:30:00 | YY PERSONAL COMPUTER NO.2 | 97/01/15 | YY AGENCY | T0533333 | 00:00:30:00 |
| FTT99232 | 01:00:00 | YY PERSONAL COMPUTER NO.3 | 97/01/15 | YY AGENCY | T0533333 | 00:01:00:00 |
| UUI88123 | 00:30:00 | PP HOUSE | 96/12/31 | PP REAL ESTATE AGENCY | T8012571 | 00:00:00:00 |

Fig. 3

| MATERIAL ID CODE | MATERIAL LENGTH (MIN:SEC: FRAME) | MATERIAL NAME | USE PERIOD (YEAR/ MONTH/DAY) | SPONSOR | STATUS |
|---|---|---|---|---|---|
| CAR01234 | 00:30:00 | CUTE 96 NEW CAR | 97/01/31 | ABC COMPANY | MATERIAL HAS BEEN FILED → LINK A |
| AAA31123 | 00:15:00 | BDD BLACK TEA | 96/12/31 | ZZ AGENCY | MATERIAL HAS BEEN FILED → LINK B |
| SSS00234 | 01:00:00 | WWW CANNED COFFEE | 97/03/31 | GDF COMPANY | MATERIAL HAS BEEN FILED → LINK C |
| DAS55612 | 00:15:00 | TTT COSMETICS | 97/01/31 | TTR COMPANY | MATERIAL HAS BEEN FILED |
| FTT99231 | 00:15:00 | YY PERSONAL COMPUTER NO.1 | 97/01/15 | YY AGENCY | MATERIAL HAS BEEN RECORDED |
| FTT99232 | 00:30:00 | YY PERSONAL COMPUTER NO.2 | 97/01/15 | YY AGENCY | MATERIAL HAS BEEN FILED |
| FTT99232 | 01:00:00 | YY PERSONAL COMPUTER NO.3 | 97/01/15 | YY AGENCY | MATERIAL HAS BEEN RECORDED |
| UUI88123 | 00:30:00 | PP HOUSE | 96/12/31 | PP REAL ESTATE AGENCY | MATERIAL HAS BEEN RECORDED |

Fig. 4A

| SUPPLY BUFFER UNIT NO. | PRESENCE /ABSENCE OF MATERIAL | FILE NAME | SUPLY COMPLETION FLAG | USE FREQUENCY LEVEL | LAST SUPPLY EXECUTION DATE/TIME (YEAR/MONTH/DAY HR:MIN:SEC) | SUPPLY EXECUTION COUNTER ← LINK A | | | |
|---|---|---|---|---|---|---|---|---|---|
| | | | | | | P1 | P2 | P3 | P4 |
| DABUF1 | PRESENCE | AR012345-1 | OFF | 3 | 96/11/08 08:00:00 | 0 | 8 | 35 | 16 |
| DABUF2 | PRESENCE | AR012345-2 | OFF | 5 | 96/11/14 17:00:00 | 0 | 0 | 5 | 52 |
| DABUF3 | PRESENCE | AR012345-3 | ON | 4 | 96/11/14 15:30:00 | 0 | 2 | 17 | 47 |

Fig. 4C

| SUPPLY BUFFER UNIT NO. | PRESENCE /ABSENCE OF MATERIAL | FILE NAME | SUPLY COMPLETION FLAG | USE FREQUENCY LEVEL | LAST SUPPLY EXECUTION DATE/TIME (YEAR/MONTH/DAY HR:MIN:SEC) | SUPPLY EXECUTION COUNTER | | | |
|---|---|---|---|---|---|---|---|---|---|
| | | | | | | P1 | P2 | P3 | P4 |
| DABUF1 | ABSENCE | SSS00234-1 | OFF | 3 | 96/11/08 08:00:00 | 0 | 3 | 43 | 25 |
| DABUF2 | PRESENCE | SSS00234-2 | OFF | 2 | 96/10/28 21:00:00 | 7 | 16 | 4 | 0 |
| DABUF3 | ABSENCE | SSS00234-3 | ON | 3 | 96/11/14 15:30:00 | 0 | 21 | 38 | 24 |

LINK C

Fig. 5

| SUPPLY DATE/TIME (YEAR/MONTH/DAY HR:MIN:SEC) | PROGRAM ID CODE | TITLE | SUPPLY TIME LENGTH (HR:MIN:SEC: FRAME) | MATERIAL ID CODE |
|---|---|---|---|---|
| 96/11/20 08:00:00 | CB20-800000R | SBCM FRAMEWORK 1 – BDD BLACK TEA | 00:00:15:00 | AAA31123 |
| 96/11/20 08:00:15 | CB20-800015R | SBCM FRAMEWORK 1 – GWR NEW CAR | 00:00:15:00 | AAS44672 |
| 96/11/20 08:00:30 | CB20-800030R | SBCM FRAMEWORK 1 – TTT COSMETICS | 00:00:15:00 | DAS55612 |
| 96/11/20 08:00:45 | CB20-800045R | SBCM FRAMEWORK 1 – YY PERSONAL COMPUTER | 00:00:15:00 | FTT99231 |
| 96/11/20 08:01:00 | CB20-800100R | PROGRAM – GOOD MORNING ! THE TOWN 1 | 00:14:00:00 | PB208001 |
| 96/11/20 08:15:00 | CB20-801500R | SPONSOR CM FRAMEWORK 1 – CUTE 96 | 00:00:30:00 | CAR01234 |
| 96/11/20 08:15:30 | CB20-801530R | SPONSOR CM FRAMEWORK 1 – YY PERSONAL COMPUTER | 00:00:30:00 | FTT99232 |
| 96/11/20 08:16:00 | CB20-801600R | PROGRAM – GOOD MORNING ! THE TOWN 2 | 00:14:00:00 | PB208002 |

Fig. 6

| MATERIAL ID CODE | MATERIAL NAME | SUPPLY CHANNEL | SUPPLY DATE/TIME (YEAR/MONTH/DAY HR:MIN:SEC) | SUPPLY BUFFER UNIT NO. |
|---|---|---|---|---|
| AAA31123 | BDD BLACK TEA | CHANNEL 1 | 96/11/20 08:00:00 | OABUF1 |
| DAS55612 | TTT COSMETICS | CHANNEL 1 | 96/11/20 08:00:30 | OABUF1 |
| FTT99231 | YY PERSONAL COMPUTER 1 | CHANNEL 1 | 96/11/20 08:00:45 | OABUF1 |
| FTT99232 | YY PERSONAL COMPUTER 2 | CHANNEL 1 | 96/11/20 08:15:30 | OABUF1 |
| YYP87771 | TGF CAMERA | CHANNEL 1 | 96/11/20 08:30:00 | OABUF1 |
| FFP33675 | ADF CANNED COLA | CHANNEL 1 | 96/11/20 08:30:30 | OABUF1 |
| FFP33675 | PP MENSWEAR | CHANNEL 1 | 96/11/20 08:45:00 | OABUF1 |

| Fig. 7A |
| Fig. 7B |

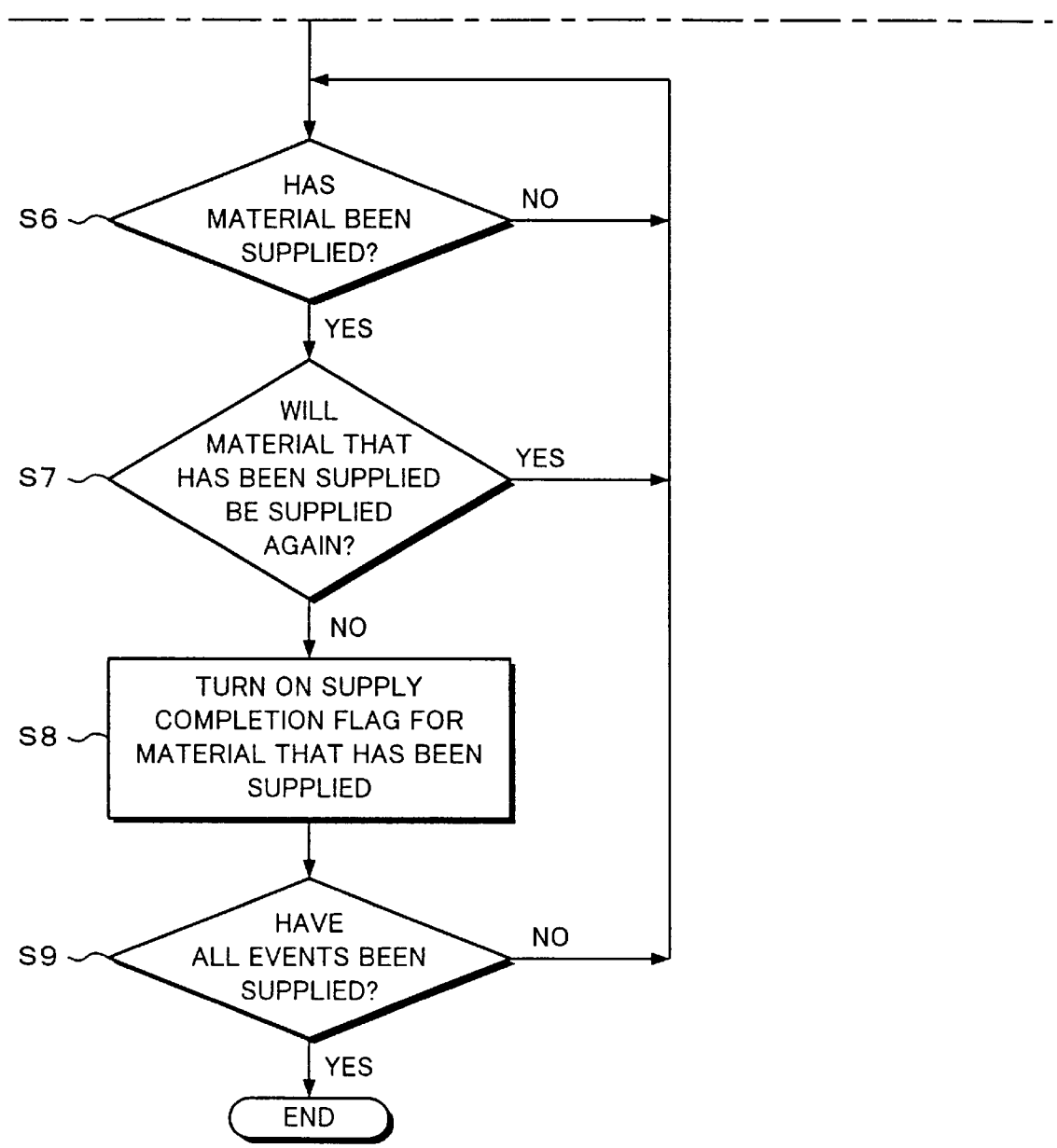

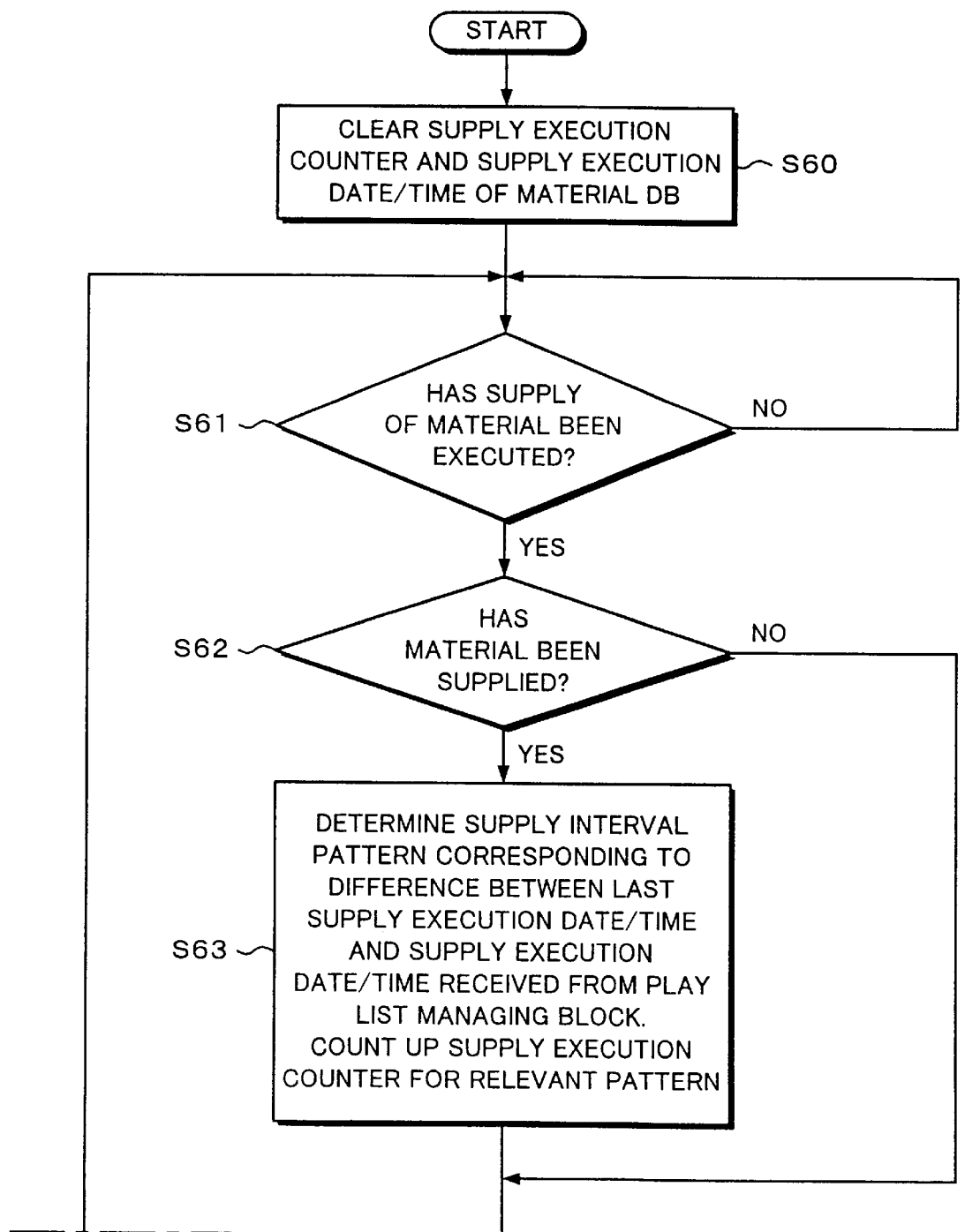

MATERIAL SUPPLYING SYSTEM AND MATERIAL SUPPLYING METHOD

BACKGROUND OF THE INVENTION

1. Field of the Invention

The present invention relates to a material supplying system and material supplying method used in a broadcast station or the like, in particular, to a supplying system for effectively using a material whose use frequency is high.

2. Description of the Related Art

In a broadcast station or the like, commercials (hereinafter referred to as CMs) and programs are broadcast by supplying visual/audio materials (hereinafter referred to as materials) recorded on video tapes or stored in disc units. A supplying system that supplies such materials has for example a material storage unit that stores all materials to be supplied and a supply buffer unit that temporarily stores only materials that will be supplied in for example several hours.

In such a conventional supplying system, materials are copied from the material storage unit to the supply buffer unit before supply date/time corresponding to a list that represents supply materials and supply time thereof (hereinafter, the list is referred to as a play list). At the supply time, the copied materials are output from the supply buffer unit. The supplied materials are deleted from the supply buffer unit after the materials have been supplied or when new materials are copied from the material storage unit. Alternatively, the materials are deleted when the material buffer unit does not have an area for temporarily storing new materials to be supplied.

However, in the conventional supplying system, since materials that were supplied are deleted, if the materials are CM materials that are frequently supplied and repeatedly used, the materials are copied from the material storage unit to the supply buffer unit whenever the materials are supplied. Thus, it takes time to copy the materials, thereby adversely affecting the copying operation for other materials.

Particularly, in a supplying system that supplies a plurality of materials to respective channels, this problem becomes exacerbated. Such a supplying system having a plurality of channels is composed of one material storage unit and a plurality of supply buffer units corresponding to the channels. Thus, in the supplying system having the plurality of channels, copying operation time for each supply buffer unit is restricted. Consequently, the number of times of the copying operation for each supply buffer unit should be suppressed. However, in such a conventional supplying system, it takes time for the copying operation for materials that are repeatedly supplied, thereby remarkably disturbing the copying operation for other materials.

In addition, a check operation for determining whether or not a material was normally copied from the material storage unit to a relevant supply buffer unit was performed by reproducing a copied material from the supply buffer unit. In the conventional supplying system, even materials that are repeatedly used are deleted from relevant supply buffer units once they were supplied. Thus, the check operation should be performed whenever each material that is repeatedly used is copied. Consequently, a substantially wasteful operation is required.

OBJECTS AND SUMMARY OF THE INVENTION

Therefore, an object of the present invention is to provide a material supplying system and material supplying method that effectively use materials that are repeatedly supplied and that smoothly performs a copying operation for copying materials from a material storage unit to relevant supply buffer units, thereby suppressing a wasteful operation.

To solve the above-described problem, the present invention is a material supplying system for temporarily storing a material that includes visual data and that is stored in a first storing unit to a second storing unit and supplying the material from the second storing unit to the outside of the system, comprising a database for storing a use frequency level that represents the frequency of which a material is supplied from the second storing unit, and controlling means for causing the second storing unit to select a material whose use frequency level is the highest or the lowest from materials supplied from the second storing unit if the second storing unit does not have an area for temporarily storing a material received from the first storing unit.

To solve the above-described problem, the present invention is a material supplying method for temporarily storing a material that includes visual data and that is stored in a first storing unit to a second storing unit and supplying the material from the second storing unit to the outside, comprising the steps of (a) designating a use frequency level that represents the frequency of which a material is supplied from the second storing unit, and (b) causing the second storing unit to select a material whose use frequency level designated at the step (a) is the highest or the lowest from materials supplied from the second storing unit if the second storing unit does not have an area for temporarily storing a material received from the first storing unit.

Thus, according to the present invention, each material stored in the buffer means is designated a use frequency level. Thus, when the buffer means does not have an area for materials, materials whose use frequency levels are low are deleted from the buffer means. Consequently, materials that are frequently used and whose use frequency levels are high are prevented from being deleted. As a result, materials can be effectively used.

The above, and other, objects, features and advantage of the present invention will become readily apparent from the following detailed description thereof which is to be read in connection with the accompanying drawings.

BRIEF DESCRIPTION OF THE DRAWINGS

FIG. 2 is a schematic diagram showing an example of a filing list;

FIG. 3 is a schematic diagram showing an example of material information composing a material database;

FIGS. 4A to 4C are schematic diagrams showing an example of supply information composing a material database;

FIG. 5 is a schematic diagram showing an example of a play list;

FIG. 6 is a schematic diagram showing an example of a copy material list;

FIGS. 7A and 7B are flow charts showing a first portion of a controlling process of a deleting operation for a supply buffer unit according to a use frequency level;

FIGS. 12A and 12B are flow charts for explaining an automatic updating process of a use frequency level.

DETAILED DESCRIPTION OF THE PREFERRED EMBODIMENTS

Next, an embodiment of the present invention will be described. According to the present invention, each material stored in a material storage unit is designated a use frequency level. Corresponding to the designated use frequency levels, materials with high use frequencies are prevented from being repeatedly deleted and being repeatedly copied.

Figure 1:
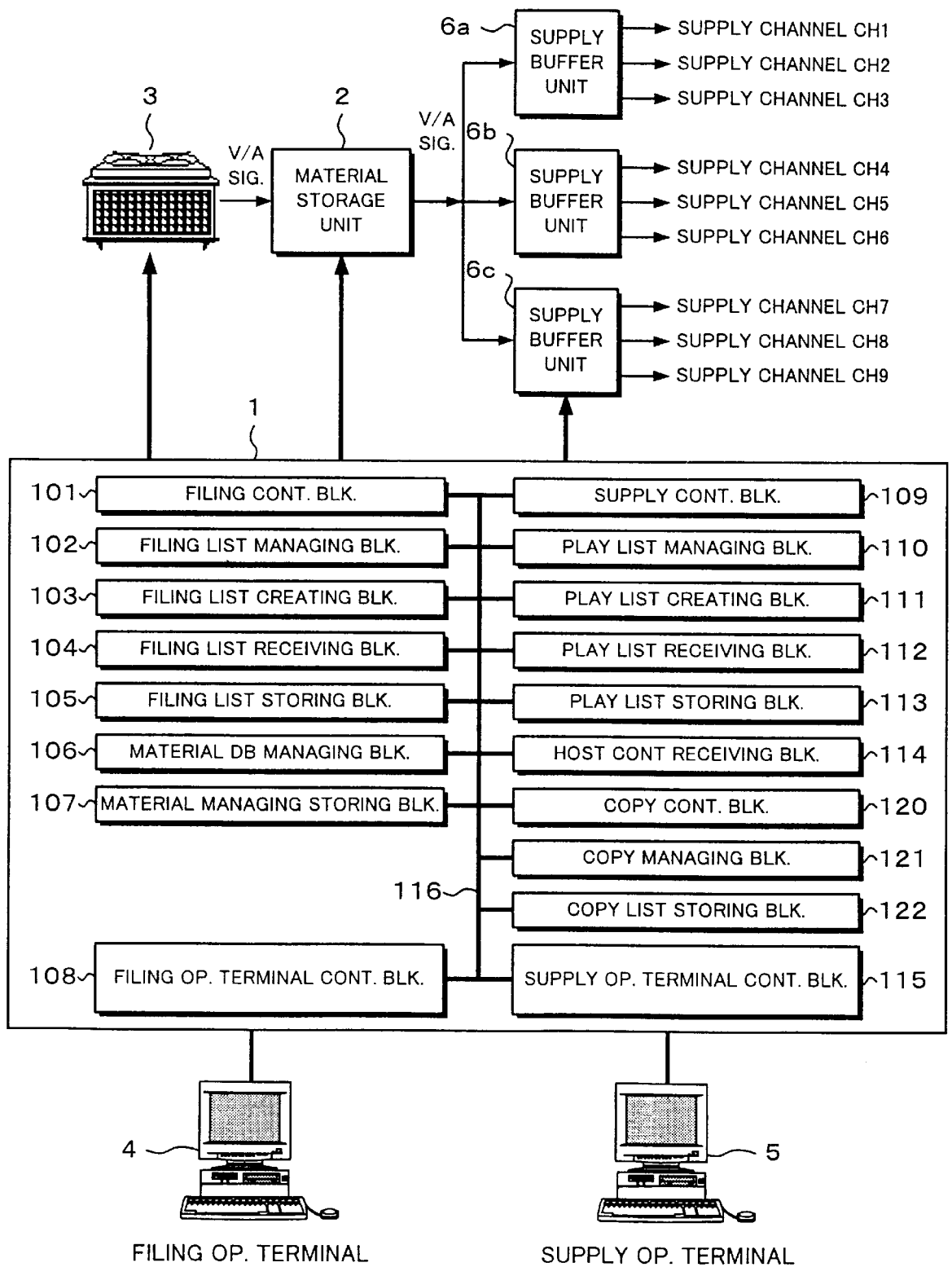
FIG. 1 is a block diagram showing an example of the structure of a supplying system according to an embodiment of the present invention.

FIG. 1 is a schematic diagram showing an example of the structure of a supplying system according to an embodiment of the present invention. The system is composed of a control computer system 1, a material storage unit 2, a material reproducing unit 3, a filing operation terminal 4, a supply operation terminal 5, and a plurality of supply buffer units 6a, 6b, and 6c.

In the supplying system, many visual/audio materials (hereinafter referred to as materials) brought from the outside as for example video tapes are reproduced by the material reproducing unit 3 and stored in the material storage unit 2. The stored materials are filed and registered to a material database under the control of the control computer system 1. When a material is supplied, the material database is referenced and the material is read from the material storage unit 2. The material that is read from the material storage unit 2 is sent to the supply buffer unit 6a, 6b, or 6c corresponding to a relevant supply channel. The relevant supply buffer unit 6a, 6b, or 6c temporarily stores the material that is read from the material storage 2. At designated supply time, the relevant supply buffer unit 6a, 6b, or 6c supplies the material to the relevant supply channel. With information such as the supplied result of the material, the material database is updated.

The material storage unit 2 can store materials. In addition, the material storage unit 2 can reproduce stored materials. Examples of the material storage unit 2 are a large-scale cassette autochanger system and an AV server. Examples of record mediums of materials are a video tape, an MO disc (Magnetic Optical disc), and a hard disk unit. The material storage unit 2 is controlled by the control computer system 1 with commands exchanged therebetween.

With the control computer system 1, the operator of the supplying system performs a check operation for a material stored in the material storage unit 2 and registers the material to the material database (that will be described later) so as to file the material. Since the material has been filed, it can be managed and thereby the material supply controlling operation corresponding to the present invention can be performed.

The material reproducing unit 3 reproduces a material that was brought from the outside of the supplying system. An example of the material reproducing unit 3 is a video tape recorder. As with the material storage unit 2, the material reproducing unit 3 is controlled by the control computer system 1 with commands exchanged therebetween.

The filing operation terminal 4 and the supply operation terminal 5 each have input devices (such as a keyboard and a mouse) and a display unit (such as a CRT unit). The filing operation terminal 4 and the supply operation terminal 5 are operated by the operator of the supplying system. The terminals 4 and 5 may be conventional personal computers or non-intelligent terminal units that do not have respective CPUs.

Each of the supply buffer units 6a, 6b, and 6c is composed of a particular storage medium (such as a hard disk unit, a video tape, or an MO). The supply buffer units 6a to 6c are disposed corresponding to the number of supply channels of the supplying system. Each of the program buffer units 6a to 6c has at least one supply output. In the example shown in FIG. 1, each of the three supply buffer units 6a, 6b, and 6c has three supply outputs. Thus, the supplying system has a total of nine supply channels CH1 to CH9.

In this example, the three supply buffer units 6a, 6b, and 6c are disposed. However, it should be noted that the number of supply buffer units of the present invention is not limited to three. Instead, the number of supply buffer units corresponds to the number of supply channels. Thus, one supply buffer unit may be used. In contrast, more than three supply buffer units may be used. Likewise, the number of supply output channels is not limited to nine. The supply buffer units 6a to 6c are controlled by the control computer system with commands exchanged therebetween.

The control computer system 1 is composed of a filing controlling block 101, a filing list managing block 102, a filing list creating block 103, a filing list receiving block 104, a filing list storing block 105, a filing operation terminal controlling block 108, a material database managing block 106, a database storing block 107, a supply controlling block 109, a play list managing block 110, a play list creating block 111, a play list receiving block 112, a play list storing block 113, a host control receiving block 114, a copy controlling block 120, a copy managing block 121, a copy list storing block 122, and a supply operation terminal controlling block 115. The blocks 101 to 114 and the blocks 120 to 122 are composed of a memory, programs, or a storing unit such as a hard disk (not shown). The blocks 101 to 114 and the blocks 120 to 122 communicate data and exchange control commands through a control bus 116.

The filing controlling block 101 is a block that controls the material storage unit 2 and the material reproducing unit 3. The supply controlling block 109 is a block that controls the supply buffer units 6a to 6c.

The control computer system 1 may be composed of one computer or a plurality of computers. When the control computer system 1 is composed of a plurality of computers, blocks that compose the control computer system 1 are properly distributed to the plurality of computers. Thus, the computer network functions as a part of the control bus 116.

In addition, the control computer system 1 may be connected to a host computer system such as a data managing computer (not shown) or to a computer network. In this case, a control command such as PLAY (reproduction) for the material storage unit 2 is sent from the host computer system to the host control receiving block 114. The block 114 performs a predetermined process. In this example, the host control receiving block 114 sends a command to the material storage unit 2.

The filing operation terminal controlling block 108 and the supply operation terminal controlling block 115 are blocks that control the filing operation terminal 4 and the supply operation terminal 5, respectively. In other words, messages for the operator are supplied from the control computer system 1 to the blocks 108 and 115. The blocks 108 and 115 perform predetermined processes for the messages and send the resultant messages to the terminals 4 and 5, respectively. The resultant messages are displayed on for example a display unit. In addition, messages that are input by the operator or the like from the terminals 4 and 5 are sent to the blocks 108 and 115, respectively. The blocks 108 and 115 perform predetermined processes and send the resultant messages to the control computer system 1.

The blocks 102 to 105 are blocks that perform processes with respect to a filing list that represents filing information of materials stored in the material storage unit 2. As shown in FIG. 2, the filing list represents information of materials that have been filed. The filing list is composed of items that represents information of original materials that have been filed (the items are for example a material identification code for identifying a material, a material name, a material length, a sponsor name, a use period, a source of a material, and SOM (Start Of Material)). The material identification code is unique for each material stored in the material storage unit 2. With the material identification codes, many materials that have been stored are identified.

The filing list creating block 103 allows the operator of the operator to create a filing list on the filing operation terminal 4. A filing list sent from the host computer system or the like is received by the filing list receiving block 104. A filing list that has been created or received is stored in the filing list storing block 105 and managed by the filing list managing block 102.

The material database managing block 106 and the material database storing block 107 are blocks that compose a database with respect to material information. The database stores storage information of materials stored in the material storage unit 2 along with the items that represent information of source materials in the filing list.

Figure 4B:
Figures 7, 7A:
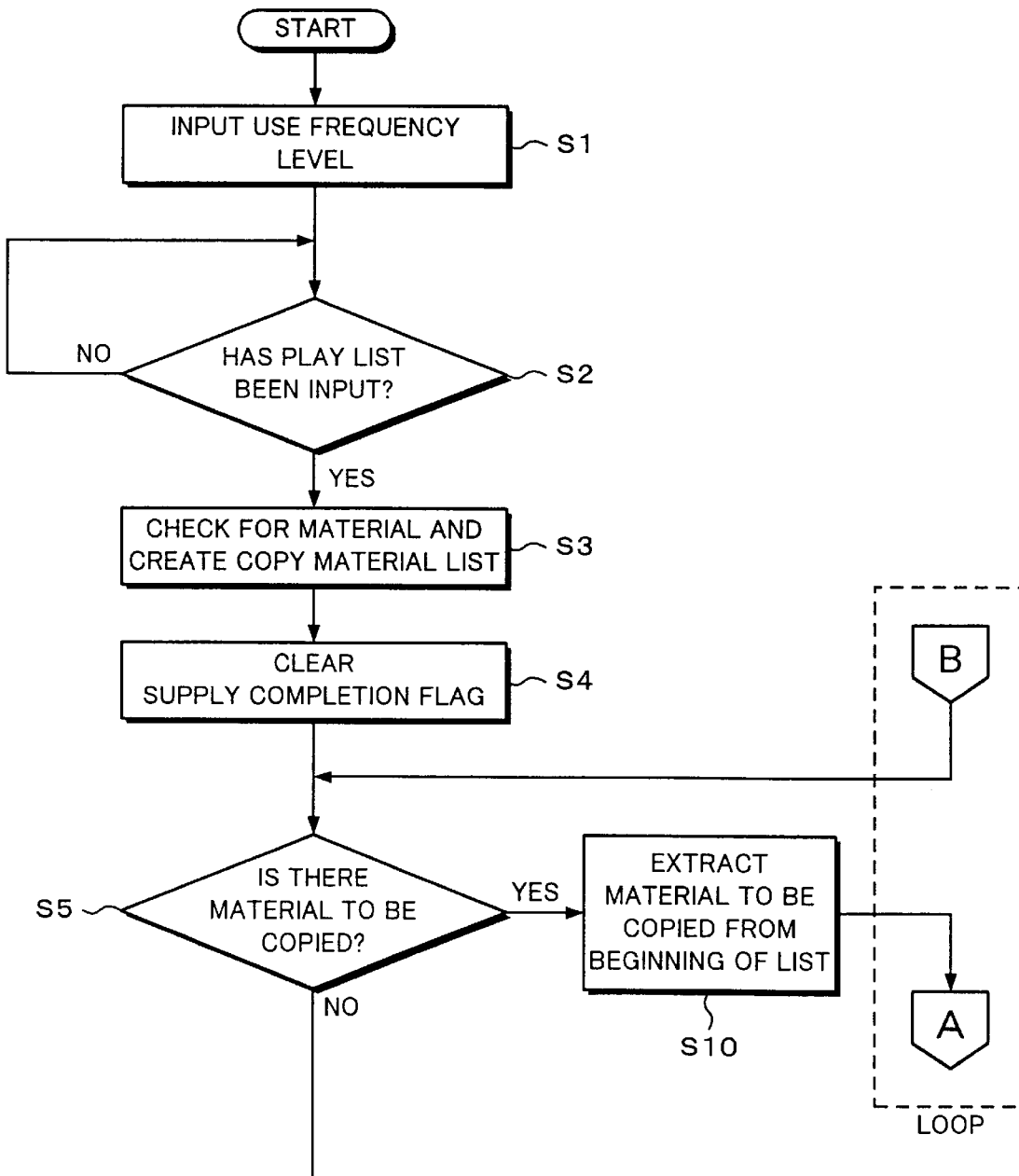

FIGS. 3 to 4C show an example of the structure of the material database. The material database is composed of material information that represents information of materials shown in FIG. 3 and supply information that represents supply states of materials shown in FIGS. 4A to 4C. Items that compose the material information are the items of the above-described filing list (namely, a material identification code, a material length, a use period, a material name, and so forth) and statuses that represent whether or not individual materials have been filed and stored. In FIG. 3, part of such items is omitted.

Of course, the filing list may have other items such as a record medium ID for identifying a record medium on which a material was filed, an address of a material on a record medium, and a flag that represents whether or not a material that was filed can be supplied as a check result of the filed content (referred to as a review).

Each material of the material information is linked to supply information of each material in the supply buffer units 6a, 6b, and 6c (links A, B, and C in FIG. 3). FIG. 4 shows an example of the supply information. The supply information has data items for each of the supply buffer units 6a to 6c. In this example, the supply buffer units 6a, 6b, and 6c correspond to supply buffer units Nos. "OABUF1", "OABUF2", and "OABUF3", respectively.

Supply information shown in FIGS. 4A, 4B, and 4C is linked to links A, B, and C shown in FIG. 3, respectively. In other words, the supply information shown in FIGS. 4A, 4B, and 4C are represented by material identification codes "ARO12345", "AAA31123", and "SSS00234", respectively.

In the supplying system according to the embodiment, three supply buffer units 6a, 6b, and 6c are disposed. Materials to be supplied are stored in the supply buffer units 6a, 6b, and 6c corresponding to designated supply channels. Thus, for one material, the number of pieces of data corresponding to the number of supply buffer units is created (in this example, three pieces of data are created).

The supply information is composed of items that are a supply buffer unit number, the presence/absence of a material, a file name, a supply completion flag, a use frequency level, a last supply execution date/time, and a supply execution counter composed of supply interval patterns P1 to P4.

The file name is a file name of a linked material in each of the supply buffer units 6a, 6b, and 6c. The presence/absence of a material is a flag that represents that each of the supply buffer units 6a, 6b, and 6c buffers a particular material. This is because a material that was supplied may be deleted from a relevant supply buffer unit.

The supply completion flag is a flag that represents whether or not a particular material has been supplied. The last supply execution date/time represents the date and time at which a particular material was supplied last. The use frequency level represents the use frequency of a relevant material. In this example, the use frequency level is designated one of five levels. The supply execution counter is a counter that counts up corresponding to a predetermined supply interval pattern. In this example, the supply interval pattern is designated one of four patterns P1 to P4. The use frequency level and the supply execution counter will be described later.

The blocks 110 to 113 are blocks with respect to a play list representing materials to be supplied. As shown in FIG. 5, the play list represents what material is supplied at what time and in what manner. The play list is composed of items that represent information with respect to materials to be supplied (the items are for example a material ID of a material to be supplied, supply start time, a material name, an event name as a unit of a program in a broadcast station, a material length, an ID of a record medium on which a material has been recorded, and an address of the record medium). The number of play lists corresponds to the number of supply channels.

The play list creating block 111 allows the operator to create a play list for each supply channel on the supply operation terminal 5. A play list sent from the host computer system or the like is received by the play list receiving block 112 for each supply channel. The play list that was created or received is stored in the play list storing block 113 and managed by the play list managing block 110.

The blocks 120, 121, and 122 are blocks with respect to a copy material list that represents materials to be copied from the material storage unit 2 to the supply buffer units 6a to 6c. As shown in FIG. 6, the copy material list represents what material should be copied to what supply buffer unit. The copy material list is composed of items that represent information with respect to materials to be copied (the items are for example a material ID code of a material to be copied, a material name, a supply channel on which a copied material is supplied from a relevant supply buffer unit, supply date/time at which a relevant material will be supplied, and a supply buffer unit to which a copied material is sent). The copy material list is stored in the copy list storing block 122 and managed by the copy managing block 121. The copying operation of materials corresponding to the copy material list is controlled by the copy controlling block 120.

Next, the operation of the supplying system will be briefly described. A material recorded on a video tape and brought from the outside of the supplying system is stored in the material storage unit 2. After the material is filed, it can be supplied. A material is filed by the filing controlling block 101 corresponding to a filing list created by the operator or a filing list received from the host computer system or the like.

The operator in charge of the filing operation operates the filing operation terminal 4 so as to cause the material reproducing unit 3 to successively reproduce many materials brought from the outside of the supplying system and the material storage unit 2 to store visual/audio signals thereof. Thus, the materials are recorded. The recorded materials are filed corresponding to the filing list.

A filing list is created and prepared by the operator. Alternatively, a filing list is received from the host computer system or the like. The filing list is sent to the control computer system 1 and stored in the filing list storing block 105. In such a manner, the filing operation of the operator is performed. At this point, the operator issues a filing list extracting command to the filing list managing block 102. Thus, the filing list managing block 102 extracts a relevant filing list from the filing list storing block corresponding to the command. Corresponding to the extracted filing list, the filing controlling block 101 controls the filing operation.

After the filing operation is completed, the material database managing block 106 causes the material database storing block 107 to store information of the material. In addition, information that represents that the material has been filed is stored in the "status" item of the material information shown in FIG. 3.

The material that has been stored and filed in the material storage unit 2 is copied to the relevant supply buffer unit 6a, 6b, or 6c. The material is copied corresponding to the above-described play list that is received or created for each supply channel. The supply time of each material in each play list is compared. With reference to the material information, materials filed in the material storage unit 2 are searched in the order of the earlier supply time. The materials are copied to the supply buffer units 6a, 6b, and 6c corresponding to supply channels represented by the play lists.

In other words, the play list managing block 110 references the material information and determines whether or not materials represented by the play lists have been stored in the supply buffer unit 6a, 6b, or 6c corresponding to supply channels represented by the play lists. If materials represented by the play lists have not been stored in the relevant supply buffer units 6a, 6b, and 6c, the play list managing block 110 sends a copy request to the copy management block 121. The copy request causes the copy managing block 121 to copy materials to the relevant supply buffer units 6a, 6b, and 6c.

The copy managing block 121 determines the copy order of materials in the order of supply date/time corresponding to the copy request and creates the copy material list. The created copy material list is stored in the copy storing block 122. Corresponding to the copy material list, the copy managing block 121 sends the copy request to the relevant supply buffer unit 6a, 6b, or 6c. The copy controlling block 120 copies a designated material from the material storage unit 2 to the designated supply buffer unit 6a, 6b, or 6c.

After the designated material has been copied, the copy managing block 121 sends a copy completion message to the material database managing unit 106. Thus, the material database is updated with the copying operation of the material. For example, with respect to data on the relevant supply channel, the "presence/absence of material" item of the supply information shown in FIG. 4 is changed from "absence" to "presence". The file name of the material is written to the "file name" item.

When a material is copied from the material storage unit 2 to the supply buffer unit 6a, 6b, or 6c, if the relevant supply buffer unit 6a, 6b, or 6c does not have a blank area for the material, the material cannot be copied thereto. To prevent this problem, when a material is to be copied to the supply buffer unit 6a, 6b, or 6c, the copy managing block 106 determines whether or not the relevant supply buffer unit 6a, 6b, or 6c has a blank area for the material.

When the relevant supply buffer unit 6a, 6b, or 6c does not have a blank area, a material that has been supplied and that is unnecessary is deleted therefrom. In other words, the copy managing block 121 sends a material delete request to the copy controlling block 120. Corresponding to the material delete request, the copy controlling block 120 deletes a designated material from the relevant supply buffer unit 6a, 6b, or 6c.

According to the present invention, an unnecessary material is deleted corresponding to a use frequency level that has been designated to each material buffered in each supply buffer unit. The designating operation for a use frequency level and the deleting operation for an unnecessary material corresponding to the use frequency level will be described later.

After a designated material has been deleted, the copy managing block 121 sends information representing the deleted material and the relevant supply buffer unit 6a, 6b, or 6c to the material database managing block 106. The material database managing block 106 causes the "presence/absence of material" item of the supply information shown in FIG. 5 to be changed to "absence". Thus, the material database is updated with the deleted material.

The supply buffer units 6a, 6b, and 6c supply materials corresponding to the respective play lists. The supply controlling block 109 is a block that causes materials to be supplied corresponding to play lists. In other words, the supply controlling block 109 searches a desired material from those buffered in the supply buffer units 6a, 6b, and 6c corresponding to the play lists with command exchanged therebetween and supplies the material at designated supply start time.

As described above, according to the present invention, unnecessary materials are deleted from the supply buffer units 6a, 6b, and 6c corresponding to predetermined use frequency levels of individual materials buffered therein. In other words, according to the present invention, a material whose use frequency is low is searched corresponding to a predetermined use frequency level and deleted corresponding to the searched result. The use frequency level is automatically updated corresponding to the real supply state of the material.

Next, the designating operation of a use frequency level will be described. As described above, a use frequency level is designated for each material stored in the material storage unit 2 for each of the supply buffer units 6a, 6b, and 6c. In other words, each material stored in the material storage unit 2 is designated a use frequency level for each of the supply buffer units 6a, 6b, and 6c. In the example of which the three supply buffer units 6a, 6b, and 6c are used, each material is designated up to three use frequency levels.

A use frequency level is designated corresponding to the real use frequency of each material (namely, depending on the number of times the material has been supplied). In the embodiment of the present invention, a use frequency level is designated one of five level values.

Level 5: Permanently stored (not deleted)
Level 4: High use frequency
Level 3: Intermediate use frequency
Level 2: Low use frequency
Level 1: One-time use The real method for designating a use frequency level will be described later.

It should be noted that the number of level values of each use frequency level is not limited to five. Instead, the user can freely designate the number of level values of each use frequency level.

A designated use frequency level is included in the supply information. In more detail, the designated use frequency level is included as the "use frequency level" item of the supply information shown in FIG. 4 for each of the supply buffer units 6a, 6b, and 6c.

When an unnecessary material is deleted from the relevant supply buffer unit 6a, 6b, and 6c, a material whose use frequency level is the lowest and that has not been designated in the play lists is deleted. On the other hand, when all materials have been designated in the play lists, a material whose supply time is the oldest and whose use frequency level is the lowest is deleted. A material whose use frequency level is "5" is not deleted.

FIGS. 7A to 11 are flow charts showing a controlling process of a deleting operation for a material from the supply buffer units 6a, 6b, and 6c corresponding to respective use frequency levels. The flow charts shown in FIGS. 7 to 11 are first to fifth portions of one flow chart. Letters A to G in FIGS. 7 to 11 represent flows of respective processes.

At step S1 (FIGS. 7A and 7B), when a material is filed, the operator inputs a use frequency level thereof. The use frequency levels are designated higher levels in the order of high supply frequencies of which materials are actually supplied from the supply buffer units 6a to 6c. When materials are filed in the material storage unit 2, the operator may know a material whose supply frequency is high. At this point, the operator can input the use frequency of a material when he or she files materials. In this example, the use frequency level is one of level values "1" to "5". As an initial level value of the use frequency level, an intermediate level value "3" has been designated. For materials whose use frequency levels have not been input, the initial level value is used. A use frequency level that has been input can be changed after a material has been filed.

After a use frequency level has been input, at step S2, the supplying system waits until a play list is input. The p lay list may be input by the operator or received from a host computer system or the like. After all play lists for all the supply channels have been input, the flow advances to step S3.

At step S3, the supplying system determines whether or not materials designated in the play lists have been buffered in relevant buffer units in the order of events (that are supply units such as programs and commercials) with earliest supply time. In other words, the play list managing block 110 sends information that represents a material identification code and a relevant buffer unit number to the material database managing block 106. In the following description, it is assumed that the relevant supply buffer unit is the supply buffer unit 6a shown in FIG. 1 and that the supply channel on which a material is supplied is the supply channel CH1.

Corresponding to the received information, the material database managing block 106 references the material database and extracts information of a relevant material from the material database recording block 107. Corresponding to the extracted information, the material database managing block 106 determines whether or not the designated material has been buffered in the supply buffer unit 6a and sends the determined result to the play list managing block 110.

Corresponding to the determined result, a copy material list is created. In other words, when the designated material has not been buffered in the supply buffer unit 6a, the play list managing block 110 sends a copy request command to the copy managing block 121. The copy request command causes the copy managing lock 121 to copy the relevant material stored in the material storage unit 2 to the supply buffer unit 6a (hereinafter, the request command may be referred to as "request"). At this point, a material identification code and material supply date/time are added to the request.

When a particular material is designated to a plurality of events in the play list, the play list managing block 110 selects an event with the earliest supply date/time and performs the above-described process for the selected event.

When the copy managing block 121 receives the copy request, it creates a copy material list with materials to be copied that are arranged in the order of supply date/time corresponding to the copy request. In other words, in the copy material list, materials are arranged in the order of the earlier date/time. As described above, the copy material list includes a material identification code, supply date/time, and a supply buffer unit number. The copy material list is stored in the copy list storing block 122.

When the supply buffer unit 6a buffers the materials of all the events in the play list at step S3, the play list managing block 110 sends a copy request completion message to the copy managing block 121. When the copy material list is created at step S3, the flow advances to step S4. At step S3, since all materials in the play list have been buffered in the supply buffer unit 6a, it is not necessary to copy materials stored in the material storage unit 2 to the supply buffer unit. Thus, in this case, a blank copy material list is created.

At step S4, for materials that have been designated in the play list and that have been buffered in the supply buffer unit 6a, the play list managing block 110 sends a supply completion flag clear request to the material database block 106. The supply completion flag clear request causes the supply completion flag of the supply information shown in FIG. 8 to be off. Information that represents a material identification code and earliest supply date/time is added to the request. In this example, when the supply completion flag is turned off, it is cleared.

The material database managing block 106 clears the supply completion flag of the supply information (stored in the material database storing block 107) for the material designated by the request and writes the last supply execution date/time to the supply information. When the supply completion flag of the designated material has been cleared and the stored supply date/time is earlier than the requested date/time, the supply information of the material is not updated.

At step S5, when the copy managing block 121 has received the copy request completion message from the play list managing block 110, the copy managing block 121 determines whether or not there is a material to be copied. In other words, the copy managing block 121 references the copy material list created at step S3 and determines whether or not the list is blank.

At step S5, when the copy material list is blank, it is not necessary to copy a material. Thus, events in the play list are supplied with materials stored in the supply buffer unit 6a. Next, the flow advances to step S6. At step S6, it is determined whether or not a material has been supplied corresponding to an event. When the determined result at step S6 is Yes, the flow advances to step S7.

A process in the case that the copy material list is not blank and a material should be copied at step S5 will be described later.

At step S7, the play list managing block 110 determines wether or not a material that has been supplied is designated in the play list. When the determined result at step S7 is Yes, the flow returns to step S6. When the determined result at step S7 is No, the play list managing block 110 determines that the material has been supplied and sends a message that represents the determined result to the material database managing block 106. The material database managing block 106 turns on the supply completion flag of the supply infromation of the material and represents that the material has been supplied (at step S8).

At step S9, the play list managing block 110 determines that all events in the play list have been supplied. When the determined result at step S9 is No, the flow returns to step S6. When the determined result at step S9 is Yes, the process is completed.

Next, a process in the case that the copy material list is not blank and a material should be copied from the material storage unit 2 to the supply buffer unit will be described. In this process, the flow advances to step S10. At step S10, materials to be copied are selected from the beginning of the copy material list. Next, the flow advances to step S20 shown in FIG. 8.

In the flow charts shown in FIGS. 7 to 11, the flow returns from step S10 to S5 (from portion A to portion B) as long as the copy material list has a material to be copied.

Figure 8:
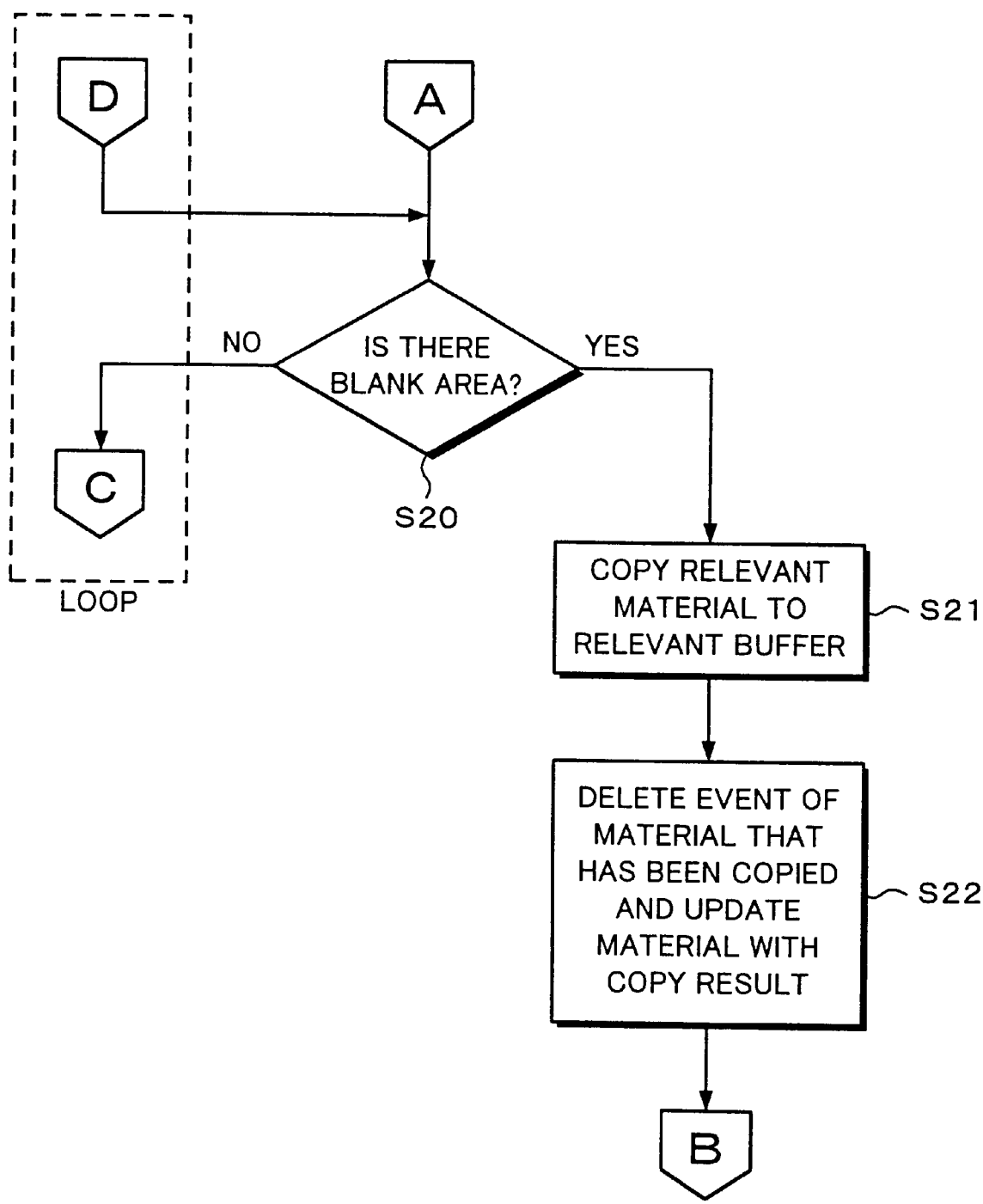
FIG. 8 is a flow chart showing a second portion of the controlling process of the deleting operation for the supply buffer unit according to a use frequency level.

At step S20 shown in FIG. 8, it is determined whether or not the supply buffer unit 6a has a blank area for a material to be copied. In other words, the copy managing block 121 sends a blank area check request to the copy controlling block 120. The blank area check request causes the copy controlling block 120 to check whether the supply buffer unit 6a has a blank area for a material. Corresponding to the request, the copy controlling block 120 detects the storage amount of the blank area of the supply buffer unit 6a. The information of the storage amount of the blank area is sent to the copy managing block 121. The copy managing block 121 determines whether or not the supply buffer unit 6a has a sufficient area for a material to be copied.

When the determined result at step S20 is Yes, the flow advances to step S21. At step S21, the relevant material is copied from the material storage unit 2 to the supply buffer unit 6a. The copy managing block 121 sends a copy request for the material selected at step S10 to the copy controlling block 120. The copy request is composed of information that represents a material identification code of a material to be copied and a supply buffer unit No that is the supply buffer unit 6a to which the material is copied. The copy request is received by the copy controlling block 120. Corresponding to the copy request, the copy controlling block 120 controls the material storage unit 2 and the supply buffer unit 6a so as to copy a designated material from the material storage unit 2 to the supply buffer unit 6a. After the material has been copied, the copy controlling block 120 sends a copy completion message to the copy managing block 121.

When the copy completion message has been received by the copy managing block 121, the flow advances to step S22. At step S22, the copy managing block 121 deletes the information of the copied material from the copy material list. In addition, the copy managing block 121 sends a database update request to the material database managing block 106. The database update request causes the material database managing block 106 to update the material database with the material that has been copied to the supply buffer unit 6a. This request is composed of information that represents for example a material identification code of a material to be copied and supply date/time. The request is sent to the material database managing block 106.

When the material database managing block 106 receives the request, it changes the "presence/absence of material" item of the supply information shown in FIG. 4 to "presence" that represents that the designated material has been copied to the supply buffer unit 6a and writes the supply date/time to the supply information. Thereafter, the flow returns to step S5.

Figure 9:
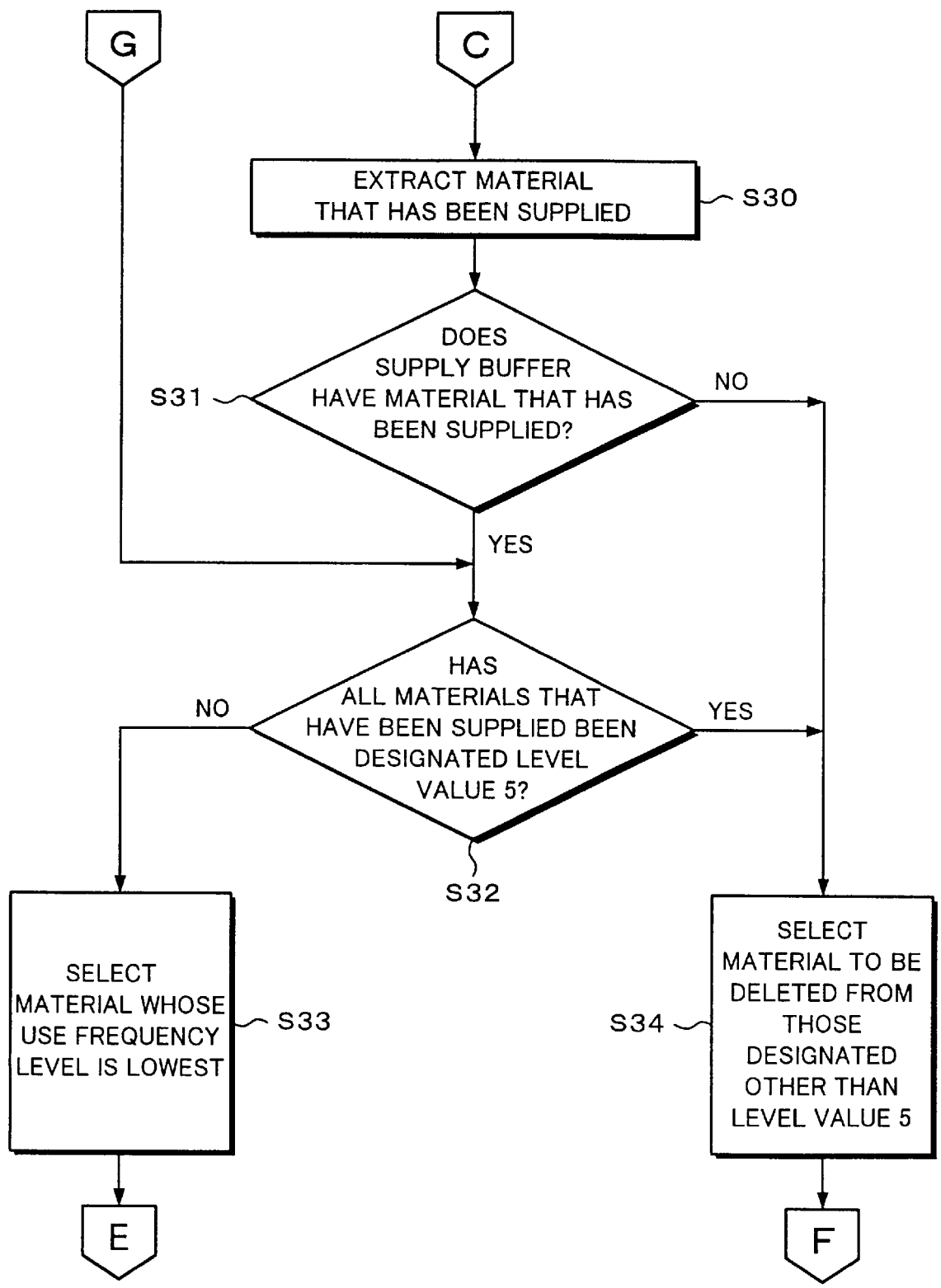
FIG. 9 is a flow chart showing a third portion of the controlling process of the deleting operation for the supply buffer unit according to a use frequency level.
Figure 10:
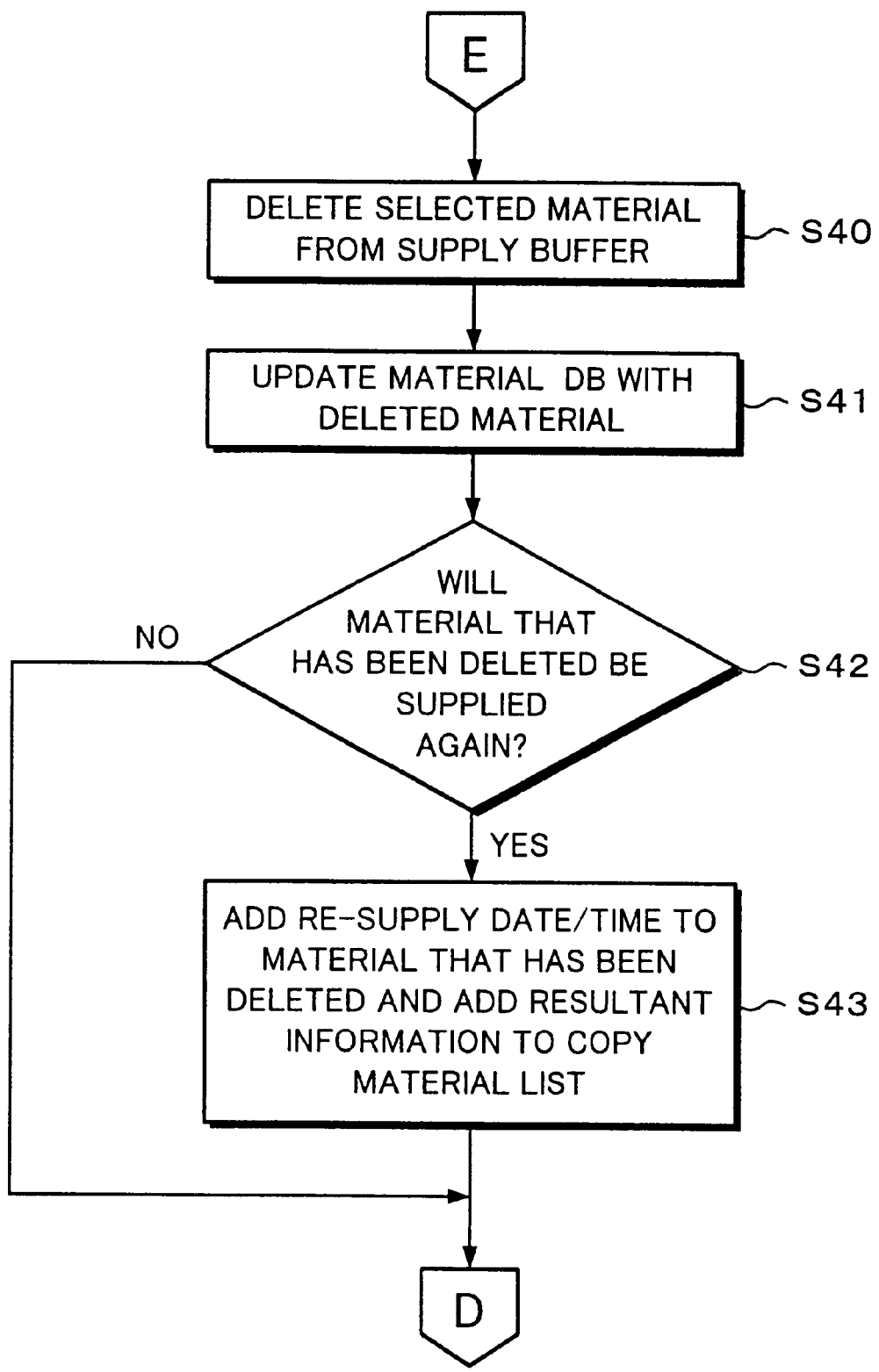
FIG. 10 is a flow chart showing a fourth portion of the controlling process of the deleting operation for the supply buffer unit according to a use frequency level.

On the other hand, when the determined result at step S20 is No, the flow advances to step S30 shown in FIG. 9.

In the flow charts shown in FIGS. 7 to 11, the flow returns from the branch "No" of step S20 to step S20 (namely, from portion C to portion D) until the supply buffer unit 6a has a blank area for a material to be copied.

At step S30, to delete unnecessary materials from the supply buffer unit 6a, materials that have been supplied are extracted from those buffered in the supply buffer unit 6a. The copy managing block 121 sends a material extracting request to the material database managing block 106. The request causes the material database managing block 106 to extract materials that have been supplied from the supply buffer unit 6a. Corresponding to the request, the material database managing block 106 searches relevant materials from the material database. Corresponding to the searched result, information representing materials that have been supplied from the supply buffer unit 6a is obtained. The obtained information is designated a use frequency level for each material for each supply buffer unit as a list. The resultant list is sent as a supplied material list to the copy managing block 121.

At step S31, the copy managing block 121 determines each material in the list whether or not the supply buffer unit 6a has a material that has been supplied corresponding to the list. When the determined result at step S31 is Yes, the flow advances to step S32. Corresponding to the use frequency level added to the supplied material list, the copy managing block 121 determines whether or not the use frequency level of each of the materials that have been supplied in the supply buffer unit 6a has been designated "5" that represents the permanent storage.

When the determined result at step S32 is No, the flow advances to step S33. At step S33, a material whose use frequency level is the lowest is selected as a material to be deleted from materials buffered in the supply buffer unit 6a. Next, the flow advances to step S40 shown in FIG. 10.

At step S40, the material selected at step S33 is deleted from the supply buffer unit 6a. The copy managing block 121 sends a material deleting request to the copy controlling block 120. The material deleting request causes the copy controlling block 120 to delete a selected material. The material deleting request is composed of information that represents a material identification code of a material to be deleted and a supply buffer unit number that represents the supply buffer unit 6a. Corresponding to the material deleting request, the copy controlling block 120 controls a designated supply buffer unit (namely, in this example, the supply buffer unit 6a) and deletes the designated material. After the copy controlling block 120 has deleted the material, it sends a material delete completion message to the copy managing block 121.

At step S41, the material data base is updated with the material deleted at step S40. When the material delete completion message is received by the copy managing block 121, the copy managing block 121 sends a material database update request to the material database managing block 106. The material database update request causes the material database to be updated with the material deleted from the supply buffer unit 6a. The material database managing block 106 updates the material database with the material that has been deleted. This operation is performed by changing the "presence/absence of material" item of the supply information for the relevant buffer unit shown in FIGS. 4A, 4B and 4C to "absence".

When the material database is updated with the material that has been deleted, it is determined whether or not the material that has been deleted will be supplied again at step S42. In other words, the copy managing block 121 inquires of the play list managing block 110 whether the material that has been deleted from the supply buffer unit 6a at step S41 will be supplied again. At this point, the copy managing block 121 sends information that represents for example a material identification code of a material that has been deleted and a supply buffer unit number that is the supply buffer unit 6a from which the material has been deleted to the play list managing block 110.

Corresponding to the information, the play list managing block 110 searches a play list corresponding to a designated supply buffer unit (in this example, the supply buffer unit 6a) and determines whether or not the material designated as a material that has been deleted will be supplied again. When the determined result at step S42 is No, the determined result is sent to the copy controlling block 116. Thereafter, the flow returns to step S20 shown in FIG. 8.

On the other hand, when the determined result at step S42 is Yes, the determined result is supplied to the copy controlling block 116. At this point, information representing the earliest supply date/time is added to the determined result. Thereafter, the flow advances to step S43. At step S43, information that represents the deleted material and the earliest supply date/time is added to the copy material list. When this information is added to the copy material list, the flow returns to step S20 shown in FIG. 8.

When the determined result at step S31 is No or when the determined result at step S32 is Yes, the flow advances to step S34.

At step S34, a material with the oldest supply date/time is selected as a material to be deleted unless the use frequency level of material is "5". The copy managing block 121 sends a search request to the material database managing block 106. The search request causes the material database managing block 106 to search a material whose frequency use level is not "5" and whose supply date/time is the oldest from those buffered in the supply buffer unit 6a. The material database managing block 106 searches a material from the material database corresponding to the request. As the searches result, the database managing block 106 sends information that represents the relevant material (for example, an identification code and supply date/time) to the copy managing block 121. The copy managing block 121 selects the material as a material to be deleted.

Figure 11:
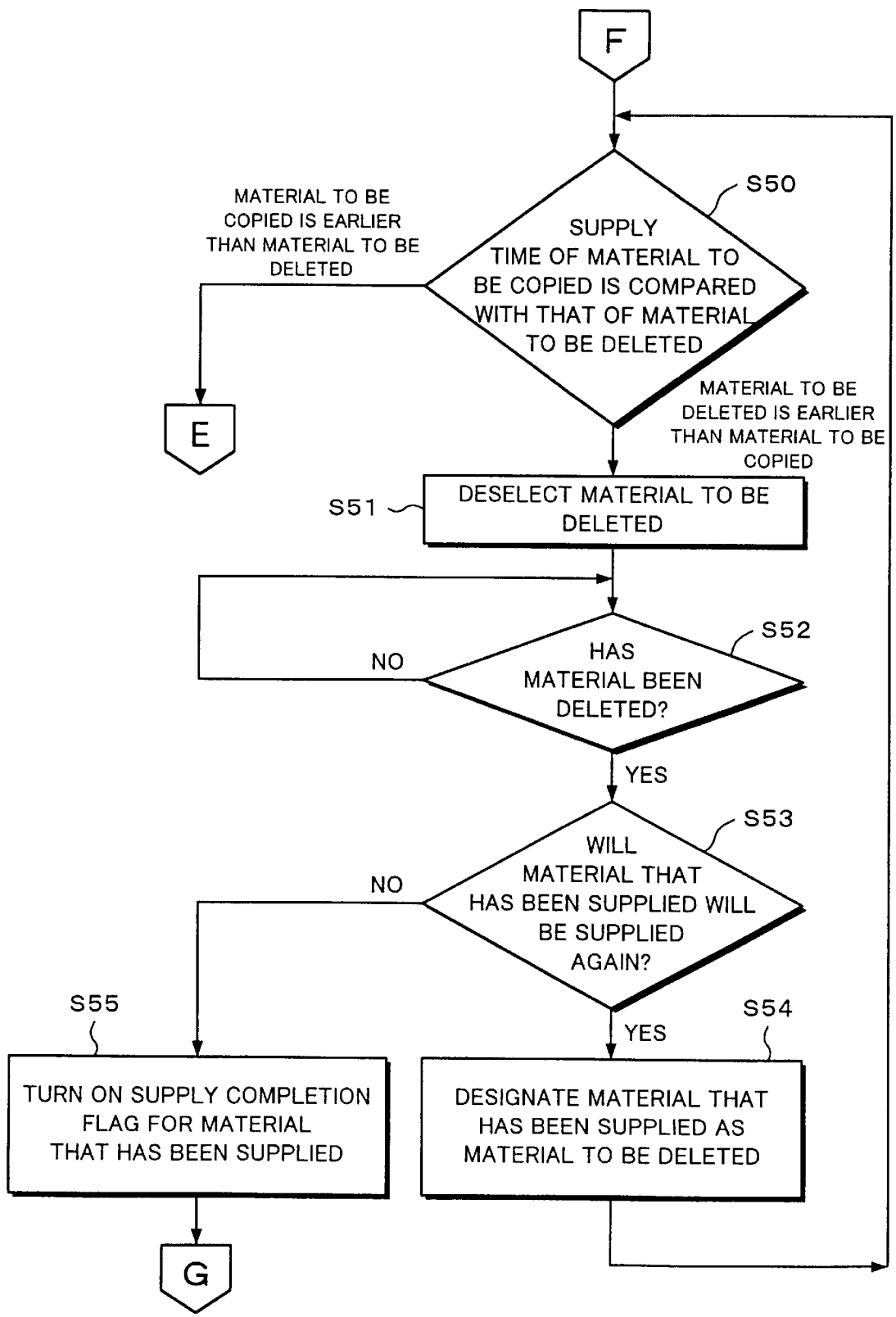
FIG. 11 is a flow chart showing a fifth portion of the controlling process of the deleting operation for the supply buffer unit according to a use frequency level.

When the database managing block 106 has sent the searched result at step S34, the flow advances to step S50 shown in FIG. 11. At step S50, the supply date/time of a material to be deleted as the searched result is compared with the supply date/time of the material obtained at step S10 (see FIG. 7). When the supply date/time of the material to be copied is earlier than the supply date/time of the material to be deleted, the flow returns to step S40 (see FIG. 10). At step S40, a material that has been selected at step S33 (see FIG. 9), that has been supplied, and whose use frequency level is the lowest is deleted.

On the other hand, when the supply date/time of the material to be deleted is earlier than the supply date/time of the material to be copied, the flow advances to step S51. At step S51, the material to be deleted is deselected. In other words, the material is treated as a material that is not deleted. The resultant material is held until it is supplied. At step S52, the material is supplied. When a material has been supplied, the flow advances to step S53.

At step S53, the play list managing block 110 references a relevant play list and determines whether or not a material that has been supplied is designated as a material that will be supplied again. When the determined result at step S53 is Yes, the flow advances to step S54.

At step S54, the play list managing block 110 sends information to the copy managing block 121. The information represents that a material has been repeatedly supplied and the next earliest supply date/time. The copy managing block 121 selects the relevant material as a material to be deleted. Thereafter, the flow returns to step S50.

When the determined result at step S53 is No, the flow advances to step S55. At step S55, the play list managing block 110 sends information to the material database managing block 106. The information represents a material that has been supplied will not be supplied again. Thus, the material database managing block 106 turns on the supply completion flag of the relevant supply information and sends information to the copy managing block 121. The information represents that a material has been supplied. Thus, the copy managing block 121 adds a material that has been supplied to the supply completion material list created at step S30. When the supply completion flag has been turned on and the material that has been supplied has been added to the list, the flow returns to step S32 (see FIG. 8).

According to the present invention, corresponding to the use frequency levels designated for materials for the supply buffer units 6a to 6c, materials that have been supplied are deleted from the supply buffer units 6a to 6c. The use frequency levels can be automatically updated. Next, the automatic updating process for the use frequency levels will be described.

For each of the supply buffer units 6a to 6c that compose the supplying system, the number of times each material has been supplied is counted with a supply execution counter. When a material is supplied, the supply execution counter compares the current supply time with the last supply time of the material, determines an interval pattern corresponding to the supply interval, and counts up the count value of the interval pattern.

As described above, the supply information shown in FIG. 4 has the "last supply execution time" item that is time at which a material was supplied from the relevant supply buffer 6a, 6b, or 6c. The supply interval of a material is obtained by comparing the current supply time of the material and the last supply execution time.

There are (n−1) material supply interval patterns (where n is the number of level values of use frequency levels). The reason why 1 is subtracted from the number of level values is in that the use frequency level of a material that is not deleted is designated the highest level value. Thus, the use frequency level is not changed. In other words, since a material whose use frequency level is the highest (in this embodiment, a material whose use frequency level is "5") is designated a material to be permanently stored, the use frequency level thereof is not automatically updated.

In the example of which the number of level values of use frequency levels is five, there are four interval patterns. The intervals at which a material is supplied and counted up are designated as follows.

Pattern P4: within four hours
Pattern P3: within one day
Pattern P2: within two days
Pattern P1: two days or more These patterns P1 to P4 correspond to the patterns P1 to P4 of supply information shown in FIG. 4.

In other words, in the pattern P1, when a relevant material was supplied within four hours, it is counted up. In the pattern P4, when a relevant material was supplied more than two days before, it is counted up.

Values designated to the patterns P1 to P4 can be freely changed corresponding to the situation of the system.

The use frequency levels are updated every a predetermined use frequency update period (for example every one week). When the predetermined use frequency update period elapsed, count values of the supply execution counter are compared. Corresponding to the count values, level values 1 to 4 of the use frequency levels are designated. In this example, a material whose count value of the interval pattern P4 is the largest is designated the use frequency level "4" as a material with the highest use frequency. Likewise, a material whose count value of the interval pattern P1 is the largest is designated the use frequency level "1" as a material with the lowest use frequency. This rule applies to other level values of the use frequency levels.

Figure 12B:
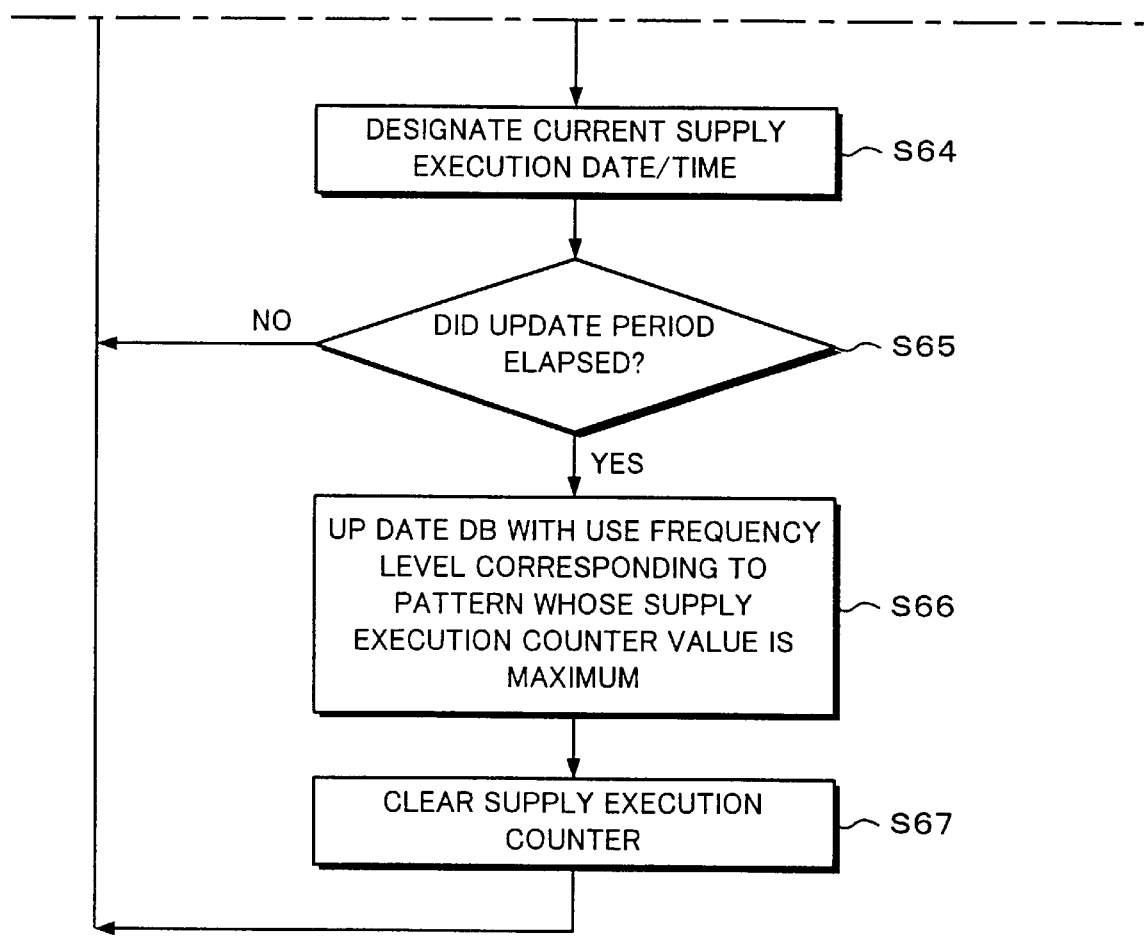

FIGS. 12A and 12B are flow charts for explaining an updating process for a use frequency level. The process shown in the flow chart shown in FIGS. 12A and 12B are executed in parallel with the process shown in the flow charts shown in FIGS. 7 to 11. The supply interval patterns P1 to P4 have been designated before the process shown in FIGS. 12A and 12B is executed. In the process shown in FIGS. 12A and 12B, the use frequency levels are updated at predetermined intervals. The use frequency update intervals have been designated before the process shown in FIGS. 12A and 12B is executed. Designated values of the use frequency update intervals are stored in a predetermined file of the material database by the material database managing block 106.

After a material has been filed to the material storage unit 2, the filing list managing block 102 sends a filing completion message to the material database managing block 106. The material database managing block 106 updates each item of the material database with the material data and clears the supply execution counter and the last supply execution date/time of the supply information (at step S60). For example, the material database managing block 106 designates the count value of each pattern of the supply execution counter to "0" and the last supply execution date/time to "00/00/00 00:00:00".

At step S61, the material filed at step S60 is held in the material storage unit 2 until the material is supplied. When the material is supplied, the play list managing block 110 sends the material identification code, the supply execution date/time, and the supply buffer unit number (in this example, the supply buffer unit 6a) to the material database managing block 106.

The material database managing block 106 searches a relevant material from the material database corresponding to the received message. Corresponding to the supply information linked to the searched material, the material database managing block 106 determines whether the supply execution date/time item of the designated supply buffer unit 6a is not blank (at step S62). When the determined result at step S62 is Yes (namely, the supply execution date/time item is not blank), the material database managing block 106 determines that the material has been supplied. Thus, the flow advances to step S63.

On the other hand, when the determined result at step S62 is No (namely, the supply execution date/time is blank), the flow advances to step S64, skipping step S63. The process at step S64 will be described later.

At step S63, the material database managing block 106 calculates the difference between the supply execution date/time as the searched result that is the la st supply execution date/time and the supply execution date/time received from the p lay list managing block 110 at step S61. The material database managing block 106 determines the supply interval pattern P1, P2, P3, or P4 corresponding to the calculated result. Corresponding to the determined result, the supply execution counter for the relevant supply interval pattern (for example, the supply interval pattern P2) is counted up.

At step S64, the material database managing block 106 searches supply information of the relevant material from the material database and writes the supply execution date/time received from the play list managing block 110 at step S61 to the "supply execution date/time" item of the supply information. Thus, the current supply execution date/time is designated to the supply execution date/time item. Consequently, the supply execution date/time is updated. When the supply execution date/time is updated, the flow advances to step S65.

At step S65, the material database managing block 106 determines whether or not the predetermined use frequency update period elapsed. When the determined result at step S65 is No (namely, the use frequency update period did not elapse), the flow returns to step S61.

When the determined result at step S65 is Yes (namely, the use frequency update period elapsed), the flow advances to step S66. At step S66, the use frequency levels are updated. In other words, the material database managing block 106 extracts the supply execution count values for the supply interval patterns P1 to P4 from the supply information of the material database for each material for each of the supply buffer units 6a to 6c. For each of the supply buffer units 6a to 6c, the extracted supply execution count values corresponding to the patterns P1 to P4 are compared. Thus, a supply interval pattern with the maximum count value is obtained.

When the supply interval pattern with the maximum count value is obtained, the material database managing block 106 determines a use frequency level corresponding to the obtained supply interval pattern. For example, with respect to the material "ARO12345" shown in FIG. 4A, the count value of the supply interval pattern P3 in the supply buffer unit 6a represented by "OABUF1" as a supply buffer unit number is the maximum. Thus, the use frequency level is designated "3". Likewise, with respect to the material "AAA31123" shown in FIG. 4B, the supply interval pattern P2 of the supply buffer unit 6b represented by "OABUF2" as a supply buffer unit number is the maximum. Thus, the use frequency level is designated "2". On the other hand, with respect to the supply buffer unit 6b shown in FIG. 4A, the counter value of the pattern P4 is the maximum. However, since the use frequency level has been designated "5", this counter value is not used.

The resultant use frequency level is written to supply information of the material database. Thus, the material database is updated with the use frequency level. The use frequency level is updated for each material of the material database for each of the supply buffer units 6a to 6c.

When the use frequency level has been updated, the flow advances to step S67. At step S67, the material database managing block 106 clears the supply execution counter of the supply information of the material database. This operation is performed for each of the supply interval patterns P1 to P4 for each of the materials for each of the supply buffer units 6a to 6c. After the counter has been cleared, the flow returns to step S61. Thereafter, the process is repeated from step S61.

As described above, according to the present invention, the use frequency level for each of materials of each of supply buffer units is automatically designated corresponding to the number of times each material has been supplied. Thus, materials that are repeatedly supplied can be suppressed from being deleted. Consequently, the copying operation of materials that are copied from the material storage unit to the supply buffer units can be decreased. As a result, the material transfer efficiency can be improved.

In addition, since the number of times of the copying operation of materials for one supply buffer unit is optimized and the number of times the copying operation is performed is decreased, many supply buffer units can be connected to one material device storage unit. Thus, one material storage unit can support many supply channels.

In addition, since the number of times the copying operation is performed for each supply buffer unit is decreased, materials can be easily copied from the material storage unit to supply buffer units even if a play list is suddenly changed.

In addition, since the number of times of the copying operation for materials that are repeatedly supplied is decreased, the process for deter mining whether or not materials have been normally copied to supply buffer units can be quickly performed.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A material supplying system for temporarily storing a material that includes video data and that is stored in a first storing unit and copied to a second storing unit having a plurality of buffers each for storing video materials of at least one playlist to be supplied from the second storing unit to the exterior of the system, comprising:

a database for storing a use frequency level that represents the frequency at which a material is supplied from the second storing unit, and for storing permanent status designation information for predetermined materials stored in said second storage unit; and controlling means for causing the second storing unit to delete a material whose use frequency level is the lowest from materials stored in the second storing unit and to maintain storage of said materials designated with permanent status, if the second storing unit does not have an area for temporarily storing a playlist material to be received from the first storing unit.

2. The material supplying system as set forth in claim 1, wherein said database registers supply date/time of a material supplied from the second storing unit; and wherein said controlling means causes the second storing unit to select a material whose supply date/time is the oldest from materials registered as those that have not been supplied from the second storing unit in said database and deletes the material from the second storing unit if the second storing unit does not have an area for temporarily storing a material received from the first storing unit.

3. The material supplying system as set forth in claim 1, wherein the second storing unit further comprises counter means for counting up the number of times a material has been supplied; and wherein said database stores a count value counted by the counting means for each material and further comprises database updating means for rewriting said database so as to automatically update the use frequency level corresponding to the count value.

4. The material supplying system as set forth in claim 3, wherein said database stores a lowest use frequency for specific materials stored in said second storage unit that are to be supplied only a limited number of times and wherein the database updating means does not automatically update the permanent status designation information and lowest use frequency level of those stored in said database.

5. The material supplying system as set forth in claim 4, wherein said limited number of times is one time.

6. The material supplying system as set forth in claim 1, wherein if the second storing unit does not have an area for temporarily storing said playlist material to be received, the controlling means selects, for deletion, among candidate materials stored in said buffers that are not in a current playlist, and if all said candidate materials are designated with permanent status, the system compares a supply time at which the to-be-received material is designated to be supplied from one of said buffers to the exterior of the system, with supply times of already-stored materials on a playlist, and deletes a material with a later supply time than the material to be received.

7. A material supplying method for temporarily storing a material that includes video data and that is stored in a first storing unit and copied to a second storing unit having a plurality of buffers each for storing video materials of at least one playlist to be supplied from the second storing unit to the exterior, comprising the steps of:

(a) designating a use frequency level that represents the frequency at which a material is supplied from the second storing unit;

(b) designating a permanent status to predetermined materials stored in said second storage unit; and (c) causing the second storing unit to delete a material whose use frequency level designated at the step (a) is the lowest from materials stored in the second storing unit, while maintaining the storage of said materials designated with permanent status, if the second storing unit does not have an area for temporarily storing a playlist material to be received from the first storing unit.

8. The material supplying method as set forth in claim 7, further comprising the step of:

(d) designating supply date/time of a material supplied from the second storing unit; and wherein the step (c) is performed by causing the second storing unit to select a material whose supply date/time is the oldest from materials designated as those that have not been supplied from the second storing unit at the step (d) and deletes the material from the second storing unit if the second storing unit does not have an area for temporarily storing a material received from the first storing unit.

9. The material supplying method as set forth in claim 7, further comprising the steps of:

(e) counting the number of times a material has been supplied from the second storing unit; and (f) automatically updating the use frequency level designated at the step (a) corresponding to the number of times counted at the step (e).

10. The material supplying method as set forth in claim 9, wherein the designating step (b) further includes designating a lowest use frequency for specific materials stored in said second storage unit that are to be supplied only a limited number of times and wherein the step (f) does not automatically update the permanent status designation information and lowest use frequency level of those designated at the step (a).

11. The method as set forth in claim 10, wherein said limited number of times is one time.

12. The method as set forth in claim 7, further comprising:

selecting for deletion, if the second storing unit does not have an area for temporarily storing said playlist material to be received, among candidate materials stored in said buffers that are not in a current playlist, and;

if all said candidate materials are designated with permanent status, comparing a supply time at which the material to be received is designated to be supplied from one of said buffers to the exterior, with supply times of already-stored materials on a playlist, and deleting a material with a later supply time than the material to be received.

* * * * *